United States Patent Office 2,865,966
Patented Dec. 23, 1958

2,865,966
PROCESS FOR ALKYLATING PHENOL

Boushra Y. Abadir, Webster Groves, Mo., assignor to Monsanto Chemical Company, St. Louis, Mo., a corporation of Delaware No Drawing. Application July 16, 1956
Serial No. 597,840

8 Claims. (Cl. 260—624)

This invention relates to an improved process for making mono-alkylated phenols useful in the manufacture of lubricating oil additives and detergents. More particularly this invention relates to the alkylation of phenol with an acyclic polypropylene in the presence of a hydrate of toluene sulfonic acid.

The various alkylating agents provide a wide variety of useful alkyl phenols, and it is well known that the number of alkyl side chains as well as the configuration and molecular weight thereof are important factors in determining the value of the alkylated phenol, particularly when it is employed as an intermediate for making lubricating oil additives and detergents. In such usages high molecular weight mono-alkylated phenols are ordinarily employed. However, in their preparation many problems arise in obtaining satisfactory yields because of the susceptibility of known high molecular weight alkylating agents to disintegrate under alkylating conditions. Of recent it has been suggested that the various acyclic polypropylenes containing at least 9 carbon atoms be employed as alkylating agents for phenol because of their lesser tendency to disintegrate under alkylating conditions. However, the processes heretofore employed using such acyclic polypropylenes for alkylating phenol are not entirely satisfactory in providing for a mono-alkylated product.

It is an object of this invention to provide a convenient, economical and efficient method for making mono-alkylated phenols for use in making lubricating oil additives and detergents. It is a particular object of this invention to provide improved yields of a mono-alkyl phenol from phenol and an acyclic polypropylene. Further objects will be apparent from the description which follows.

In accordance with this invention it has been found that improved yields of a mono-alkylated phenol can be obtained conveniently, economically and efficiently by reacting phenol with an acyclic polypropylene containing from 9 to 24 carbon atoms in the presence of a hydrate of toluene sulfonic acid.

By "propylene polymer" as employed in the instant specification and appended claims is meant those acyclic polymers containing from 9 to 24 carbon atoms and having a molecular weight substantially equivalent to a $C_xH_{2x}$ olefin, wherein $x$ is an integer from 9 to 24. Such polymers are in general obtained by the polymerization of substantially pure propylene in the presence of either boron trifluoride, aluminum trichloride, anhydrous hydrofluoric acid, sulfuric acid, phosphoric acid or pyrophosphoric acid. They are available commercially and in general boil in the range of about 115° C. to about 350° C. A preferred propylene trimer fraction boils in the range of about 121° C. to about 138° C., while a preferred propylene tetramer fraction boils in the range of about 180° C. to about 205° C. In general these $C_{9-24}$ acyclic propylene polymers consist essentially of a single methyl radical on alternate carbon atoms of the chain, the total average of methyl radicals being in the range of $0.33n-1$ to $0.33n+1$, wherein $n$ is the total average number of alkyl carbon atoms in the alkene portion of the molecule. These acyclic propylene polymers upon condensing with phenol in accordance with the process of this invention provide a mixture of mono-alklated phenols of which the para-isomer is present to the extent of 90 to 98% by weight. It is to be understood that the products of the instant process are not limited to any particular position of the hydroxyphenyl group on the alkane chain in that a mixture of products is obtained wherein the hydroxy-phenyl nucleus is attached to the alkane chain at the end of the chain as well as near the middle thereof.

By a "hydrate of toluene sulfonic acid" is meant the compound obtained from one mol of anhydrous toluene sulfonic acid and at least one mol of water. While the monohydrate of toluene sulfonic acid is preferred, the hydrates containing 2 to 10 mols of water per mol or even higher per mol of anhydrous toluene sulfonic acid may be employed. Although the hydrates of p-toluene sulfonic acid are preferred, its meta and ortho isomers in hydrate form are also operable as well as mixtures of all three or any two of said isomers.

In order to illustrate the process of this invention is the following:

Example I

To a suitable reaction vessel equipped with a thermometer, agitator, and reflux condenser is charged 94 parts by weight (substantially 1.0 mol) of phenol. The phenol is heated to 100° C. and thereto is added dropwise over a period of 4.5 hours 126 parts by weight (substantially 1.0 mol) of a commercial acyclic propylene trimer (boiling at 121–138° C. and containing more than 95% by weight of $C_9H_{18}$) while maintaining the temperature of the mass throughout the addition at 100–105° C. During the first 3.5 hours of the propylene trimer addition a total of 19.0 parts by weight (substantially 0.10 mol) of p-toluene sulfonic acid monohydrate is added in five equal parts. Upon completion of the propylene trimer addition the mass is heated at 100–105° C. for two hours. The mass is cooled to room temperature and thereto is added with agitation 12 parts by weight of solid sodium carbonate and the mixture stirred for two hours. The mass is then subjected to vacuum distillation and the following fractions are obtained:

| | Parts by weight |
|---|---|
| Recovered unreacted material | 20 |
| Mono-nonyl phenol (120–165° C./2–3 mm.) | 180 |
| Poly-alkyl phenol | 22 |

The yield of mono-nonyl phenol based on the propylene trimer charged is 81.7% by weight. The yield of mono-nonyl phenol with respect to the total alkylated phenols produced is 89.3% by weight.

Example A

To a suitable reaction vessel equipped with a thermometer, agitator, and reflux condenser is charged 94 parts by weight (substantially 1.0 mol) of phenol. The phenol is heated to 100° C. and thereto is added dropwise over a period of 5 hours 126 parts by weight (substantially 1.0 mol) of a commercial acyclic propylene trimer (boiling at 121–138° C. and containing more than 95% by weight of $C_9H_{18}$) while maintaining the temperature of the mass throughout the addition at 103–107° C. During the first 4 hours of the propylene trimer addition a total of 17.2 parts by weight (substantially 0.10 mol) of anhydrous p-toluene sulfonic acid is added in five equal parts. Upon completion of the propylene trimer addition the mass is heated at 103–107° C. for 1.5 hours. The mass is cooled to room temperature and thereto is added with agitation 12 parts by weight of solid sodium carbonate and the mixture stirred for two hours. The mass is then subjected to vacuum distillation and the following fractions obtained:

| | Parts by weight |
|---|---|
| Recovered unreacted material | 27 |
| Mono-nonyl phenol (125–160° C./1.5–2 mm.) | 152 |
| Poly-alkyl phenol | 38 |

The yield of mono-nonyl phenol based on the propylene trimer charged is 69.6% by weight. The yield of mono-nonyl phenol with respect to the total alkylated phenols produced is 80% by weight.

Example II

To a suitable reaction vessel equipped with a thermometer, agitator, and reflux condenser is charged 103.4 parts by weight (substantially 1.1 mol) of phenol. The phenol is heated to 105° C. and thereto is added dropwise over a period of 5 hours, 126 parts by weight (substantially 1.0 mol) of a commercial acyclic propylene trimer (boiling at 121–138° C. and containing more than 95% by weight of $C_9H_{18}$) while maintaining the temperature of the mass throughout the addition at 105–110° C. During the first 4 hours of the propylene trimer addition a total of 28.5 parts by weight (substantially 0.15 mol) of p-toluene sulfonic acid monohydrate is added in five equal parts. Upon completion of the propylene trimer addition the mass is heated at 105–110° C. for 1.5 hours. The mass is cooled to room temperature and thereto is added with agitation 22 parts by weight of solid sodium carbonate and the mixture stirred for two hours. The mass is then subjected to vacuum distillation and the following fractions obtained:

| | Parts by weight |
|---|---|
| Recovered unreacted material | 36.5 |
| Mono-nonyl phenol (125–158° C./2–3 mm.) | 176 |
| Poly-alkyl phenol | 15 |

The yield of mono-nonyl phenol based on the propylene trimer charged is 80.3% by weight. The yield of mono-nonyl phenol with respect to the total alkylated phenols produced is 92.2% by weight.

In the neutralization of the acid catalyst as illustrated in the foregoing examples other alkaline materials than sodium carbonate may be employed which do not form water of condensation with toluene sulfonic acid. As illustrative of such are the alkali metal carbonates (e. g. potassium carbonate) and the alkaline earth metal carbonates (e. g. calcium carbonate). Such carbonates should be added in anhydrous form, however, commercial alkali metal and alkaline earth metal carbonates which contain as much as 5% by weight of water may be employed. The alkali metal or alkaline earth metal salts of toluene sulfonic acid formed in such a neutralization step may be filtered off prior to the distillation operation and converted by simple acidification steps well known to those in the art in instances wherein it is desirable to recover and re-use the toluene sulfonic acid. In respect to recovering and re-using the acid catalyst, it has been found that by washing the resultant reaction mass directly with water rather than neutralize the acid catalyst not only is the acid catalyst recovered substantially in toto but is recovered in a form most convenient for re-use, i. e. it is recovered in hydrate form. Additionally, it has been found that by employment of a water wash the yields of mono-alkyl phenol are increased. As illustrative of such is the following:

Example III

To a suitable reaction vessel equipped with a thermometer, agitator, and reflux condenser is charged 206.8 parts by weight (substantially 2.2 mols) of phenol and 54 parts by weight (substantially 0.29 mol) of p-toluene sulfonic acid monohydrate. The mass is heated and over a 2.5 hour period, while maintaining the temperature at 103–105° C., there is added dropwise 252 parts by weight (substantially 2 mols) of a commercial acyclic propylene trimer (boiling at 121–138° C. and containing more than 95% by weight of $C_9H_{18}$). Upon completion of the propylene trimer addition the mass is heated at 103–105° C. for 4.5 hours. The mass is then cooled to room temperature, and washed successively with two 100 parts by weight portions of water and the respective aqueous layers removed from the system. To the oily layer remaining a small amount of solid sodium carbonate is added to assure complete removal of the acid catalyst and the mixture subjected to vacuum distillation. The following fractions are obtained:

| | Parts by weight |
|---|---|
| Recovered unreacted material | 87 |
| Mono-nonyl phenol (125–160° C./2–3 mm.) | 368 |

The yield of mono-nonyl phenol based on the propylene trimer charged is 83.7% by weight. The yield of mono-nonyl phenol with respect to the total alkylated phenols produced is substantially 100% by weight. The water washes contained substantially 100% of the p-toluene sulfonic acid monohydrate originally charged.

It has been proposed that boron trifluoride be employed as a catalyst in the alkylation of phenol with acyclic propylene polymers. However, the instant process is a substantial improvement over same not only from the standpoint that the instant catalyst can be recovered and re-used, but that improved yields of a mono-alkylated product is obtained. To illustrate such is the following (i. e. Example IV and Example B).

Example IV

To a suitable reaction vessel equipped with a thermometer, agitator, and reflux condenser is charged 206.8 parts by weight (substantially 2.2 mols) of phenol and 58.5 parts by weight (substantially 0.31 mol) of p-toluene sulfonic acid monohydrate. The mass is heated and over a period of 1.67 hours, while maintaining the temperature at 110–115° C., there is added dropwise 336 parts by weight (substantially 2 mols) of a commercial acyclic propylene tetramer (boiling in the range of 180–205° C. and containing more than 90% by weight of $C_{12}H_{24}$). Upon completion of the propylene tetramer addition the mass is heated at 110–115° C. for 6 hours. The mass is then cooled to room temperature and washed successively with two 100 parts by weight of water. The water washings are combined and found to contain substantially 100% of the p-toluene sulfonic acid originally charged in the form of its monohydrate. The oily layer is then washed with a dilute aqueous solution of sodium carbonate to assure complete removal of the acid catalyst and the water layer discarded. The oily layer is then subjected to vacuum distillation and the following fractions are obtained:

| | Parts by weight |
|---|---|
| Recovered unreacted material | 60 |
| Mono-dodecyl phenol | 480 |

The yield of mono-dodecyl phenol based on the propylene tetramer charged is 92% by weight. The yield of mono-dodecyl phenol with respect to the total alkylated products produced is substantially 100%.

Example B

To a suitable reaction vessel equipped with a thermometer, agitator, and reflux condenser is charged 218 parts by weight (substantially 2.32 mols) of phenol. The mass is heated to about 85° C. and over a 3.33 hour period, while maintaining the temperature at 82–86° C., there is added dropwise 265 parts by weight (substantially 2.10 mols) of a commercial acyclic propylene tetramer (boiling in the range of 180–220° C. and containing more than 90% by weight of $C_{12}H_{24}$). During the first 25 minutes of the propylene tetramer addition there is added in a continuous fashion 17.4 parts by weight (substantially 0.122 mol) of boron trifluoride ether complex. Upon completion of the propylene tetramer addition the mass is heated at 82–86° C. for 6 hours. The mass is then cooled to room temperature and is washed successively with three 100 parts by weight of water. The respective aqueous layers are separated from the oily layer and discarded. The oily layer upon subjection to vacuum distillation yields the following fractions:

| | Parts by weight |
|---|---|
| Recovered unreacted material | 72 |
| Mono-dodecyl phenol | 345 |

The yield of mono-dodecyl phenol based on the propylene tetramer charged is 75% by weight. The yield of mono-dodecyl phenol with respect to the total alkylated products produced is approximately 87% by weight.

To further illustrate the process of this invention is the following:

*Example V*

To a suitable reaction vessel equipped with a thermometer, agitator, and reflux condenser is charged 113 parts by weight (substantially 1.2 mol) of phenol and 57 parts by weight (substantially 0.30 mol) of p-toluene sulfonic acid monohydrate. The mass so obtained is heated and thereto over a period of 2 hours, while maintaining the temperature at 125–130° C., there is added dropwise 210 parts by weight (substantially 1.00 mol) of a commercial acyclic propylene pentamer (B. P. 420–510° F.). Upon completion of the propylene pentamer addition the mass is heated at 125–130° C. for 4 hours. The mass is then cooled to room temperature and washed successively with three 100 parts by weight of water. The water washings are removed and the oily layer remaining is then washed with a dilute aqueous solution of potassium carbonate to assure complete removal of the acid catalyst. The oily layer is recovered and subjected to vacuum distillation. An excellent yield of mono-pentadecyl phenol is obtained.

*Example VI*

To a suitable reaction vessel equipped with a thermometer, agitator, and reflux condenser is charged 113 parts by weight (substantially 1.2 mols) of phenol and 56.5 parts by weight (substantially 0.30 mol) of p-toluene sulfonic acid monohydrate. The mass so obtained is heated to about 140° C. and thereto over a period of 3 hours, while maintaining the temperature at about 140° C., there is added dropwise 294 parts by weight (substantially 1.0 mol) of a commercial acyclic propylene polymer boiling in the range of 295–325° C., averaging 21 carbon atoms per molecule and consisting chiefly of propylene hexamer and propylene octamer. Upon completion of the polymer addition the mass is heated at 135–140° C. for 4 hours. The mass is then cooled to room temperature and washed successively with two 100 parts by weight of water. The water washings are removed and the oily layer remaining is then washed with a dilute aqueous solution of potassium carbonate to assure complete removal of the acid catalyst. The oily layer is recovered and subjected to vacuum distillation. An excellent yield of mono-alkyl phenol, wherein the alkyl radical averages 21 carbon atoms, is obtained.

In the process of this invention the molar ratio of phenol to the acyclic propylene polymer may vary widely, however, it is preferred that for each molecular proportion of acyclic propylene polymer that about 1.0 to 1.25 molecular proportions of phenol be employed. While in general reaction temperatures in the range of 80° C. to 150° C. are preferred, higher or lower temperatures may be employed depending upon the time cycle desired and the amount of catalyst employed. In the matter of the amount of catalyst in the process of this invention, i. e. a hydrate of toluene sulfonic acid, any catalytic amount may be employed, but in general about 0.02 to about 0.2 molar percent of the acyclic propylene polymer charged provides optimum results.

While this invention has been described with respect to certain embodiments it is to be understood that it is not so limited in that variations and modifications thereof obvious to those skilled in the art may be made without departing from the spirit or scope of this invention.

What is claimed is:

1. The process of making a mono-alkyl phenol wherein the alkyl radical is branched and contains 9 to 24 carbon atoms, which comprises reacting about 1.0 to about 1.25 mols of phenol with about 1.0 mol of an acyclic propylene polymer containing 9 to 24 carbon atoms in the presence of a catalytic amount of the monohydrate of toluene sulfonic acid.

2. The process of making a mono-alkyl phenol wherein the alkyl radical is branched and contains 9 to 24 carbon atoms, which comprises reacting about 1.0 to about 1.25 mols of phenol with about 1.0 mol of an acyclic propylene polymer containing 9 to 24 carbon atoms boiling in the range of about 115° C. to about 350° C. in the presence of a catalytic amount of the monohydrate of toluene sulfonic acid.

3. The process of making a mono-alkyl phenol wherein the alkyl radical is branched and contains 9 to 24 carbon atoms, which comprises reacting at a temperature in the range of about 80° C. to about 150° C. about 1.0 to about 1.25 mols of phenol with about 1.0 mol of an acyclic propylene polymer containing 9 to 24 carbon atoms boiling in the range of about 115° C. to about 350° C. in the presence of about 0.02 to about 0.2 mol of the monohydrate of p-toluene sulfonic acid.

4. The process of claim 3 wherein the reaction mass so obtained is neutralized with a substantially anhydrous member of the group consisting of alkali metal and alkaline earth metal carbonates and the mono-alkyl phenol produced recovered from the neutralized reaction mass by vacuum distillation.

5. The process of claim 3 wherein the reaction mass so obtained is washed with water to remove the acid catalyst and the mono-alkyl phenol produced recovered from the oily layer by vacuum distillation.

6. The process of making mono-nonyl phenol, which comprises reacting at a temperature in the range of about 100° C. to about 110° C. about 1.0 to 1.1 mols of phenol with about 1.0 mol of an acyclic propylene trimer boiling in the range of about 121° C. to about 138° C. and having a molecular weight substantially equivalent to a $C_9H_{18}$ olefin in the presence of about 0.1 to about 0.15 mol of the monohydrate of p-toluene sulfonic acid, neutralizing the mass so obtained with substantially anhydrous alkali metal carbonate, and recovering mono-nonyl phenol by vacuum distilling the neutralized reaction mass.

7. The process of making mono-nonyl phenol, which comprises reacting at a temperature in the range of about 100° C. to about 110° C. about 1.0 to 1.1 mols of phenol with about 1.0 mol of an acyclic propylene trimer boiling in the range of about 121° C. to about 138° C. and having a molecular weight substantially equivalent to a $C_9H_{18}$ olefin in the presence of about 0.1 to about 0.15 mol of the monohydrate of p-toluene sulfonic acid, washing the reaction mass so obtained with water, and recovering from the oily layer the mono-nonyl phenol produced by vacuum distillation.

8. The process of making mono-dodecyl phenol, which comprises reacting at a temperature in the range of about 110° C. to about 115° C. about 1.1 mols of phenol with about 1.0 mol of an acyclic propylene tetramer boiling in the range of about 180° C. to 205° C. and having a molecular weight substantially equivalent to a $C_{12}H_{24}$ olefin in the presence of about 0.15 mol of the monohydrate of p-toluene sulfonic acid, washing the reaction mass so obtained with water, and recovering from the oily layer the mono-dodecyl phenol produced by vacuum distillation.

References Cited in the file of this patent

UNITED STATES PATENTS

| 2,537,337 | Fearey | Jan. 9, 1951 |
| 2,655,544 | McNulty et al. | Oct. 13, 1953 |